May 24, 1938.   G. L. ESTOPPEY   2,118,041
BOMB SIGHTING DEVICE
Original Filed Sept. 5, 1930   6 Sheets-Sheet 1

INVENTOR
Georges L. Estoppey
BY Maréchal & Noé
ATTORNEY

May 24, 1938.  G. L. ESTOPPEY  2,118,041
BOMB SIGHTING DEVICE
Original Filed Sept. 5, 193.  6 Sheets-Sheet 2

FIG. 4.

INVENTOR
Georges L. Estoppey
BY Maréchal & Noe
ATTORNEY

May 24, 1938. G. L. ESTOPPEY 2,118,041
BOMB SIGHTING DEVICE
Original Filed Sept. 5, 1930   6 Sheets-Sheet 4

INVENTOR
Georges L. Estoppey
BY Maréchal & Noé
ATTORNEY

May 24, 1938.  G. L. ESTOPPEY  2,118,041

BOMB SIGHTING DEVICE

Original Filed Sept. 5, 1930  6 Sheets-Sheet 6

Inventor
Georges L. Estoppey
By Marichal & Noe
Attorney

Patented May 24, 1938

2,118,041

UNITED STATES PATENT OFFICE 2,118,041

BOMB SIGHTING DEVICE

Georges L. Estoppey, Dayton, Ohio

Application September 5, 1930, Serial No. 479,950
Renewed May 21, 1936

24 Claims. (Cl. 33—46.5)

This invention relates to sighting devices such as are used in the dropping of bombs or projectiles from aircraft, or to similar devices where there is relative movement between an objective and the sighing device and the two are at different elevations.

One object of the invention is the provision of a sighting device of this character provided with a movable sighting member, and having an adjustable timing member, means being provided for adjusting the timing member in accordance with the speed of the movable sighting member.

Another object of the invention is the provision of a sighting device of the character mentioned having a variable speed drive between a power source and the movable sighting member, the construction being such that a constant torque is applied to the power source so that its speed of operation is constant.

A further object of the invention is the provision of a sighting member for the release of bombs from aircraft, having a sighting member and an adjustable timing member the latter being adjustable along an ordinate of a coordinate system in accordance with the altitude and automatically positioned along the other ordinate in accordance with the speed of the movable sighting member.

Another object of the invention is the provision of a sighting device having a movable sighting member and an adjustable timing member supported in a novel manner to provide a very accurate and easily operated sight, which can be manipulated in a very short space of time.

Another object of the invention is the provision of means for adjusting the sight to make trail corrections, longitudinally of the sight, for compensating for air resistance of the bomb in accordance with its terminal velocity, time lag, air speed, altitude of the sight, drift angle, angle of approach with respect to a movable objective, altitude of the objective, and temperature affecting the terminal velocity of the bomb.

Another object of the invention is the provision of means for adjusting the sight to make lateral corrections compensating for the resistance of the wind against the bomb, when flying cross wind, this compensation being corrected in accordance with the air resistance of the bomb according to its terminal velocity, time lag, air speed, altitude of the sight, drift angle, angle of approach with respect to a movable objective, altitude of the objective, and temperature affecting the terminal velocity of the bomb.

Another object of the invention is the provision of a time saving scale provided for rapid adjustment of the position of the sighting member before the synchronization of the sighting device with the objective so as to reduce the time of bombing operation.

Another object of the invention is the provision of means operable during the synchronizing operation for automatically moving the sighting member as the speed of the sighting member is increased or decreased to return the objective to the line of sight.

Another object of the invention is the provision of means for giving a written sign in the field of vision for warning the operator that the bomb is about to be dropped or that the bomb dropping time is at hand.

Another object of the invention is the provision of a novel pilot directing means embodying three electric lamps which are alternatively and automatically lighted when the sight is moved about its vertical axis for indicating to the pilot the degree that the airplane should be turned to the right or to the left or to be held straight ahead.

Another object of the invention is the provision of means for automatically balancing the weight of the moving parts of the instrument so that the instrument can remain in a vertical position.

Still other objects and advantages of the invention will be apparent from the following description, the appended claims, and the accompanying drawings in which—

Figure 4:
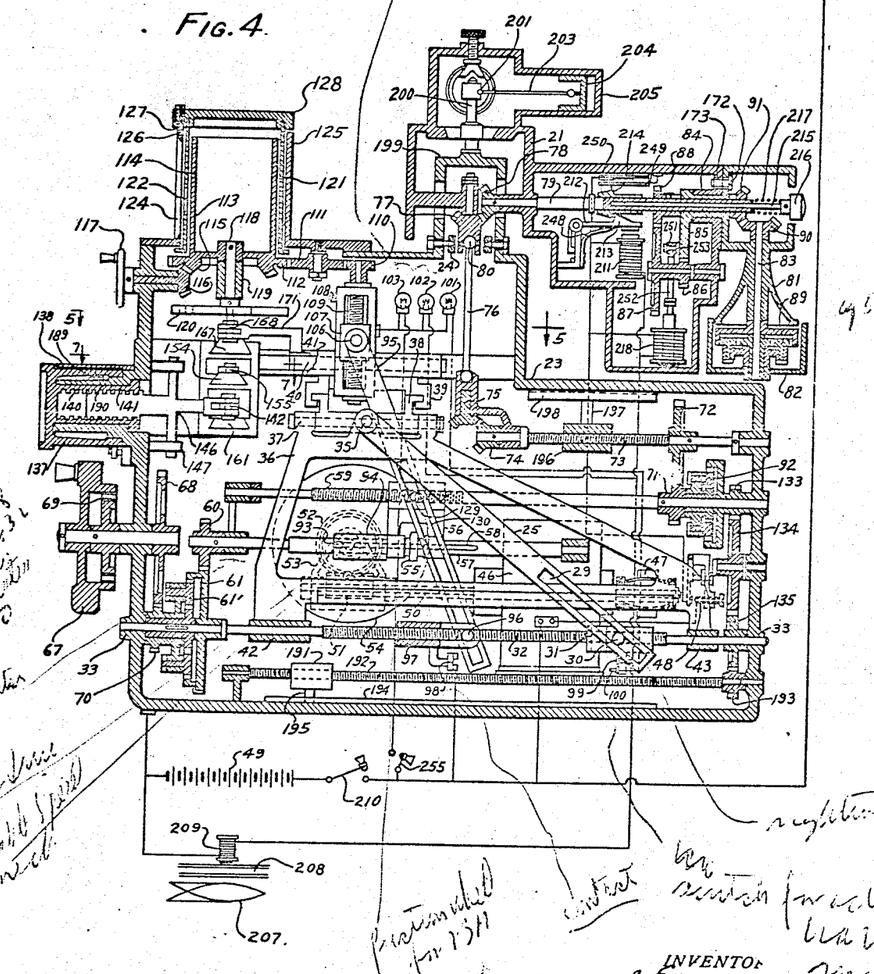
Fig. 4 is a vertical sectional view taken on the line 4—4 of Fig. 1 through the pivotally mounted supporting housing and on the line 4'—4' through the top of the standard.
Figure 11:
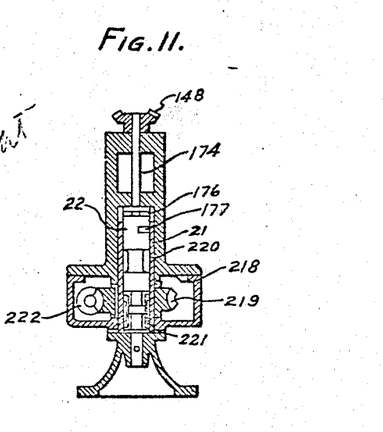
Fig. 11 is a central vertical sectional view of the main support of the sighting device.
Figure 12:
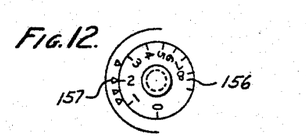
Fig. 12 is a front view of the air density dial.

The sighting device of this invention is herein shown as a bomb sight adapted for the releasing of bombs or projectiles from aircraft, but it is to be understood that the invention is susceptible to other uses where there is relative movement between an objective and the sight and the two are at different elevations. The sight, as shown, embodies a standard 21 (Fig. 11) which may be mounted in a suitable position on an aircraft or the like so that the fixed post 22 within this standard is vertically positioned on the aircraft, the standard 21 being movable about the post 22. The standard 21 forms a mount for the supporting means 23 which forms a supporting housing for various operating parts of the bomb sight. As shown in Fig. 4 the supporting means or housing 23 is supported by the gimbal mounting 24 (Fig. 4) near its top from an upper part of the standard 21 so that housing 23 hangs like a pendulum and forms a standard of position with relation to the aircraft.

A movable sighting member is provided which may be caused to follow the movements of the objective, and while this movable sighting member may be of any desired character, it is herein shown and described for purposes of illustration as an optical device 26 carried by a link 25 and having a top sight bead 27 and a bottom sight bead 28 which may be aligned with the eye and with the objective so that when the sights 27 and 28 thus aligned with the eye appear to follow the movement of the objective, the sighting member is ready for synchronizing operation. As shown the carrying or sighting link 25 is provided inside the housing 23. The lower end of the sighting link 25 is slotted at 29 and engages a pin 30 on a nut 31 which is in threaded engagement with a micrometric screw 32, the latter being mounted in suitable bearings 33 in the housing 23 and extending horizontally across the housing. Thus when the screw 32 is rotated at the proper speed the pin 30 operating in the slot 29 causes the sighting link 25 to pivot about its upper end so that the optical line follows the objective in synchronism with its apparent movement.

Figure 6:
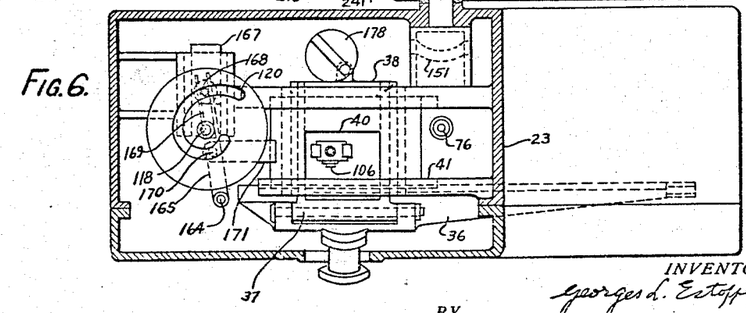
Fig. 6 is a horizontal section on line 6—6 of Fig. 2.
Figure 7:
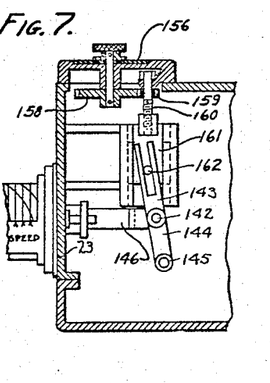
Fig. 7 is a horizontal section on line 7—7 of Fig. 4.

The bearing sleeve 34 fixed to the upper end of the sighting link 25 pivots about stud 35 which is fixed to a triangular swinging frame 36 which is pivotally supported at its lower ends. The upper end of frame 36 pivotally carries a slide 38 on axis 37, the slide being movable transversely in the guide 39 which forms a part of another slide 40 movable longitudinally in a guide 41 fixed to the main housing 23, as apparent from Figs. 4, 6, and 8. The lower part of the frame 36 has two bearing supports 42 and 43 which turn and slide longitudinally on the end parts of the micrometric screw 32. A slot 45 in the lower end of the frame slidably receives an arm projection 44 of the nut 31 to restrain the nut from turning. The slide 40 is a part of the correcting device for making trail corrections if flying in the direction of the wind or making ground course components of the trail corrections if flying adrift. By means of the slide 40, the upper end of the sighting member may be moved longitudinally of the bomb sight by several control devices that will be later described, and the slide 38 is a part of the wind deflection correcting device so that the upper end of the movable sighting member may be moved laterally in accordance with the wind deflection so that the optical line of the sighting member 26 moves along an inclined plane which is properly inclined to the vertical. (See Fig. 8.)

Within the housing 23 is a suitable power device such as an electric motor 46 (Fig. 4) of the constant speed type, this motor preferably having an automatic governor 47 which makes and breaks an electrical connection 48 so that the speed of the motor is maintained substantially constant. This motor is connected by suitable leads to a battery 49 or other source of electricity suitably located on the aircraft. The motor shaft 50 drives a worm 51 which meshes with worm wheel 52, the worm and worm wheel being suitably supported in bearings in a bracket 53 which is fastened on the supporting housing 23. The worm wheel 52 is carried on a shaft to which is fastened a friction disc 54. Engaging this friction disc, which forms the driving member of a variable speed transmission mechanism between the motor 46 and the screw 32, is a driven friction wheel 55 suitably mounted in a bracket guide 56. This bracket guide is in sliding engagement with a transverse shaft 57 which is fixed by suitable key and slot connections to the friction wheel 55, the slot 58 in this shaft extending sufficiently far so that the friction wheel 55 may be moved from the center of the disc 54 to its peripheral portion while in rotational driving connection with the shaft 57. The guide bracket 56 is parallel to the transverse shaft 57, both of these shafts being suitably mounted at their ends in bearings provided in the supporting housing. The guide bracket 56 being threaded on shaft 59, as the latter is rotated the position of the guide bracket is adjusted, and this in turn adjusts the speed of rotation of the shaft 57 since the position of the friction wheel 55 is moved towards or away from the center of driving disc 54. The shaft 57 drives the micrometric screw 32 through gear 60 and differential 61. The purpose of the differential 61 is to permit movement of the screw 32 to set the sighting link 25 at the minimum pick-up angle corresponding to altitude and air speed without corresponding movement of the shaft 57 when the motor is at rest. Preferably the differential 61 embodies planetary gears 61' carried on arms which are fixed to the gear 70, the planetary gears 61' meshing with a sun gear on the end of shaft 32 and with a large outside gear which meshes with a gear 60 on shaft 57. It will thus be apparent that the gear 68 may be rotated manually to rotate the screw 32 without imparting movement to the large outside gear of the differential meshing with gear 60, but on the other hand when the gear 60 is rotated it will impart rotational movements to the screw 32 at a proportionate speed.

Figure 1:
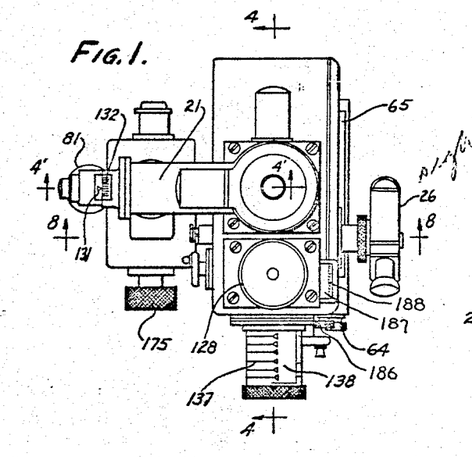
Fig. 1 is a top plan view of the sighting device embodying the present invention.
Figure 2:
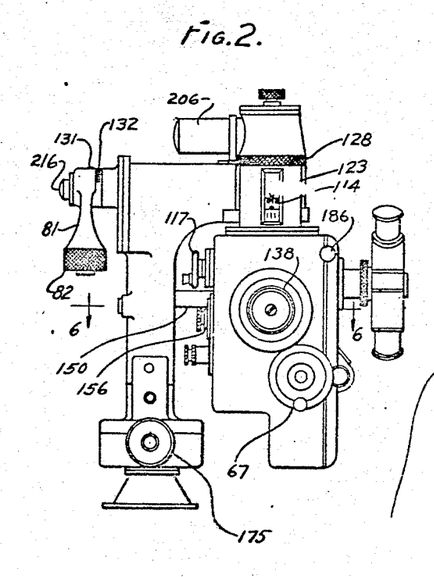
Fig. 2 is a rear elevation of the sighting device.
Figure 3:
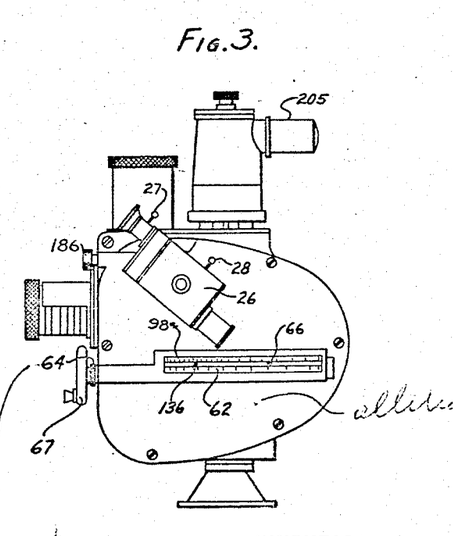
Fig. 3 is a side elevation of the sighting device.
Figures 8, 13, 14, 15, 16, 17, 20:
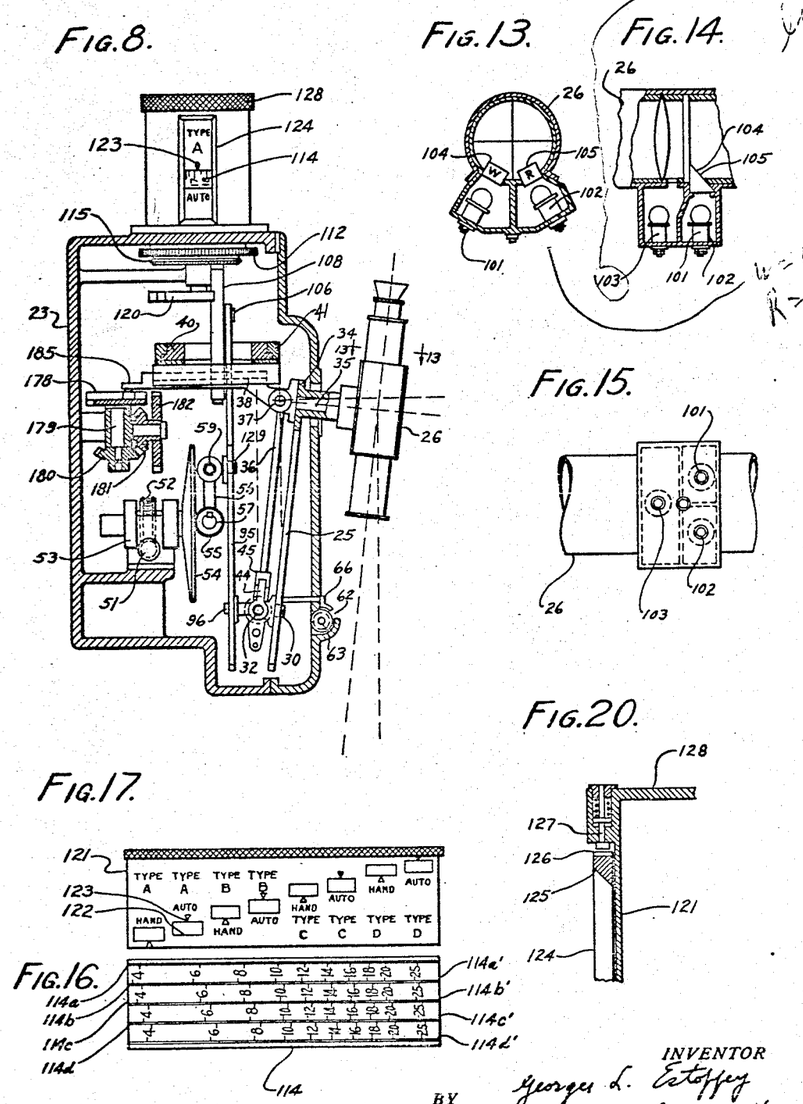
Fig. 8 is a transverse vertical section of the sighting device on the line 8—8 of Fig. 1.
Figs. 13, 14, and 15 are sectional views of the sighting member, showing the arrangement of the signal lamps device.
Fig. 16 shows a developed view of the altitude scale and personal lag scale.
Fig. 17 shows a developed view of a cylinder shield used in connection with the altitude dial and personal lag scale and type of bomb.
Fig. 20 is a sectional view of the automatic stop used in relation with the index of the shield here above mentioned.

A combined altitude and air speed scale 62 is engraved on a tube 63, see Figs. 3 and 8. The tube 63 is controlled rotatably by means of a knob 64 at the end of the tube. Rotational movements of this knob rotatably adjust the tube 63 to position the proper combined altitude and air speed scale 62 in the slot 65 on the cover to permit reading of only one set of scales at a time. The scales cooperate with an index 66 which is carried by the nut 31, having a bearing connection therewith permitting it to turn about the nut 31 when the frame 36 is inclined. The position of the index 66 (and the nut 31) may be manually controlled or set by the handwheel 67 which operates the gear 68 through a friction clutch 69 which prevents forcing or straining of the mechanism and of the timing links. The gear 68 drives the pinion 70 and operates the screw 32 through the differential 61. This preliminary setting of the nut 31 is accomplished before the synchronizing operation in order that time may be saved, making it unnecessary to follow the target for an exceedingly long period of time.

The position of the guide bracket 56 for the proper speed of operation of the sighting link 25 is determined by the rotational movement of the shaft 59. This shaft is fixed to a gear 71 at one end thereof which meshes with a gear 72 carried on a threaded shaft 73 which is suitably mounted for rotational movement in the housing 23. On the other end of this shaft 73 is a bevel gear 74 which is driven by a bevel gear 75 carried on a shaft 76. The upper end of the shaft 76 is driven by a bevel gear 77 which is driven in turn by bevel gear 78 fixed to the end of a threaded regulating shaft 79. Between the bevel gear 77 and the upper end of the shaft 76 is a suitable gimbal connection 80 so that the proper driving connection is maintained between gear 77 which is journaled on the standard 21 and shaft 76 which moves with the suspended housing 23. The regulating shaft 79 is rotated by a manually controlled handle 81, which permits rapid and approximate regulation of the position of the friction wheel 55 by operation of the handle device 81 as a lever, and permits slow and accurate regulation by rotating the control knob 82 about its shaft 83. This motion of the handle device 81, as a lever, is indicated by a handle index 131 provided on the top of the handle device and cooperating with a scale 132 provided on the standard 21. This index and scale permits the approximate setting of the handle device (which approximately sets the friction wheel 55 in accordance with the altitude and average speed) thus reducing the time required for the synchronizing operation, the scale 132 being graduated in accordance with the altitude. After roughly setting the handle device in accordance with the altitude indications of scale 132, a second approximate or rigid regulation of the position of the friction wheel 55 is obtained by pulling or pushing the handle 81 which is rotatably hung on the standard 21 in a bearing 84. Fixed to the handle 81 is a gear segment 85, which drives a train of reduction gears 86, 87, and 88, the latter being fixed on shaft 79. A differential 89 provided between the knob 82 and the handle 81 prevents the rotation of the knob 82 when the handle 81 is pulled or pushed in the manner of a lever.

Slow and accurate regulation of the speed of the screw 32 by adjustment of the position of the friction wheel 55 is obtained by turning the knob 82 about its shaft 83. In turning the knob 82, the shaft 83 is rotated through the differential 89. On the upper end of the shaft 83 is fixed pivotal gear 90 which meshes with a pivotal gear 91 fixed on shaft 79. When the knob 82 is turned the handle 81 is swung forwardly or backwardly, in accordance with the direction of turning, thus giving an indication automatically of the direction of rotation of the knob 82, showing the operator whether the knob 82 is being properly turned as he can feel the way in which the lever 81 is swinging, thus preventing confusion. The rotational movements of the knob 82 are so arranged as to provide for a rather slow turning of the shaft 79, but when the lever 81 is swung on the bearing 84, a rather large angular movement of the shaft 79 obtains.

On the shaft 59 is fixed the sun gear of the differential 92, the planetary gears of the differential being carried by arms which are rotatably supported on the shaft 59. The shaft 59 may be rotated through the gears 71 and 72 when the shaft 79 is rotated, but every time the shaft 79 is moved, the screw 32 will be driven through the gears 135, 134, 133, and the differential 92, to move the nut 31 backward or forward when the handle 81 is operated. The screw 32 at this time is being moved by the friction disc device so that the line of sight will follow the objective, but the speed of movement of the sighting member may be too slow, in which case the objective moves off of the line of sight. If the speed of the sight member is corrected this would still leave the objective displaced from the line of sight, so each time the speed of the sight member is changed, the objective is automatically brought back to the line of sight by superimposing on the normal movements of the screw 32, an additional movement through the differential 92 as previously explained. In this way the sighting member is automatically stepped up forwardly or backwardly, the lower end of the sighting member moving backward with respect to the direction of travel of the aircraft as the speed is increased and moving oppositely as the speed is decreased, returning the objective to the line of sight in an automatic manner.

The angular movements of the handle 81 are limited by a stop 172 shown in the form of a stud fixed thereon and projecting into a segmental slot 173 which is concentric to the shaft 79 and is provided on the end of the support 21.

It will now be apparent, assuming the motor 46 to be in operation and driving the micrometric screw 32 through the variable speed transmission, the manipulation of handle 81 may cause rotational movements of the threaded shaft 59 and position the bracket guide 56 in such a location as to cause the nut 31 to move along screw 32 at such a speed that the optical line of the sighting member appears to follow the movement of the objective.

To impose a substantially constant torque or driving effort on the motor as the driven friction wheel 55 moves at high or low speeds, friction drag is imposed on the disc 54 in such a way that the total torque required to drive the wheel 55 and the friction drag is substantially constant regardless of the position of the friction wheel 55. This drag is shown in the form of a suitable drag member 93 in rubbing engagement with the rotating disk 54 and carried a fixed distance away from the wheel 55 by the arms 94 extending out from the lower end of the bracket guide 56. When the friction drag 93, which preferably does not transmit the friction torque to the shaft 59, is substantially at the center of the disc 54, and its retarding effect is substantially zero, the friction wheel 55 is at its maximum distance from the center. When, however, the driving friction wheel 55 is moved towards the center of the disc 54 and the torque required from the motor is reduced, the drag member 93 is effective at a substantial distance on the other side of the center of disc 54 so that the combined torque effect of the two parts engaging disc 54 is substantially constant.

The exact time at which the bomb is to be dropped so that it may fall upon the objective is determined by means of a timing member 95, shown in the form of a pivoted slotted lever. This timing member engages a pin 96 carried on a stop slide 97 which slides freely along the micrometric screw 32. This slide carries a stop contact 98 which cooperates with a movable contact 99 carried by the nut 31, at the time of bomb release, these contacts being connected electrically to the battery 49 and to a bomb release device 209 to be later described.

Another electric contact 100 carried by the nut 31 is used for energizing a warning sign. This contact 100 is longer than contact 99, and comes into contact with 98 a little before the releasing time of the bomb and lights lamp 101, as a warning sign, while contacts 98 and 99 light the releasing signal lamp 102 at the instant of bomb release. The lamps 101 and 102 are placed in the sighting field of the sighting member 26 as shown in Figs. 13 and 14. A third lamp 103 is for lighting the reticle of the sighting member for night bombing operation.

Lamps 101 and 102, through prisms 104 and 105, project written signs in the field of the telescope, such for example as "W" and "R", see Fig. 13, meaning warning and releasing moment of the bomb respectively. The three lamps are enclosed in separate compartments.

The timing member 95 is connected at its upper end to a pin 106 provided on an altitude slide 107 which is vertically mounted for sliding movement in a guide frame 108 fixed on a side of the supporting housing 23. The slide 107 is raised and lowered to its proper position in accordance with the altitude of bombing, or vertical elevation, by a screw 109 which threads into the slide 107, the screw 109 being rotatably mounted in the guide frame 108 and carrying a gear 110 at its upper end. This gear 110 meshes with an intermediary gear 111 engaging gear 112 carrying a drum 113 on which are engraved altitude scales 114. On gear 112 is fixed a bevel gear 115, meshing with bevel gear 116, controlled by the manually operated altitude control knob 117. The shaft 118 on which is fixed the drum 113 turns in bearing 119 fixed to the housing 23. On the same shaft 118 is fixed a cam 120, see Figs. 4 and 18, the purpose of which is to correct automatically the tangent of the trail and wind deflection according to the altitude, as will be described later.

The drum 113 is controlled manually as previously mentioned, by the knob 117, this control being in accordance with the particular type of bomb and in accordance with the altitude of the airplane. The altitude scales 114 on the drum 113 are preferably arranged in separate sets indicating and computed in accordance with the actual falling time of the bomb, that is the vacuum time as modified by the time lag dependent upon the type of bomb, and also taking into consideration the personal lag which is a function of the time and of the ground speed. Thus the sets 114a, 114b, 114c, and 114d of altitude scales as shown in Fig. 16, indicate the actual falling time of the bomb without personal lag corrections, while the sets 114a', 114b', 114c', and 114d' indicate the vacuum time as modified by the time lag and personal lag. The sets 114a', 114b', 114c', and 114d' are for use when the device is to be manually operated. These scales are co-operatively associated with a cylindrical shield 121, see Fig. 17, which has a series of openings 122 and which encloses the various sets of scales leaving only parts of the scales visible through the openings. This shield 121 may be turned manually about its vertical axis to arrange the proper opening with respect to the proper scale. The openings are arranged in pairs, two openings being thus provided for each type of bomb. One opening is for cooperation with the scale 114a for automatic release while the other opening of a pair cooperates with the scale 114a', for manual release, openings being provided for the other scales as will be obvious. At each opening there is an index 123 for cooperation with the altitude scale. Thus for instance if a type A bomb is to be released automatically the shield 121 is turned until the second opening from the left of Fig. 17 coincides with the slot 124 of the sleeve 125 which is fixed on the housing 23. The exact position of the opening 122 is preferably determined by means of a notch 126 provided in the sleeve 125 and cooperating with a spring pressed stop 127 having a spring arranged in the knob 128 of the sleeve as shown in Fig. 20. The engagement of the stop in the notch is such that holding tendency of the stop may be overcome when the knob 128 is turned.

The timing member 95 is fulcrumed on a pin 129 which projects laterally from the bracket guide 56, this pin slidingly supporting the member 95 by means of the slot 130 in the latter. The timing member 95 is thus set in its proper position when the bracket guide 56 has been moved to a position so that the sighting member follows the objective. This accurately determines the position of the stop slide 97 and stop contact 98 as to effect the release of the bomb at the proper instant. It will be understood that the timing member 95 is thus set or positioned in accordance with the altitude, and also adjusted horizontally in an automatic manner in accordance with the speed of the movable sighting member.

The slide stop contact 98 carries an index 136 cooperating with a scale 98a graduated in degrees, see Fig. 3. The purpose of this device is to indicate the range angle of the preceding bombing operation and also to indicate the position of index 66 in relation to index 136 while the micrometric nut 31 is approaching the slide stop 98.

Figures 18, 19, 23:
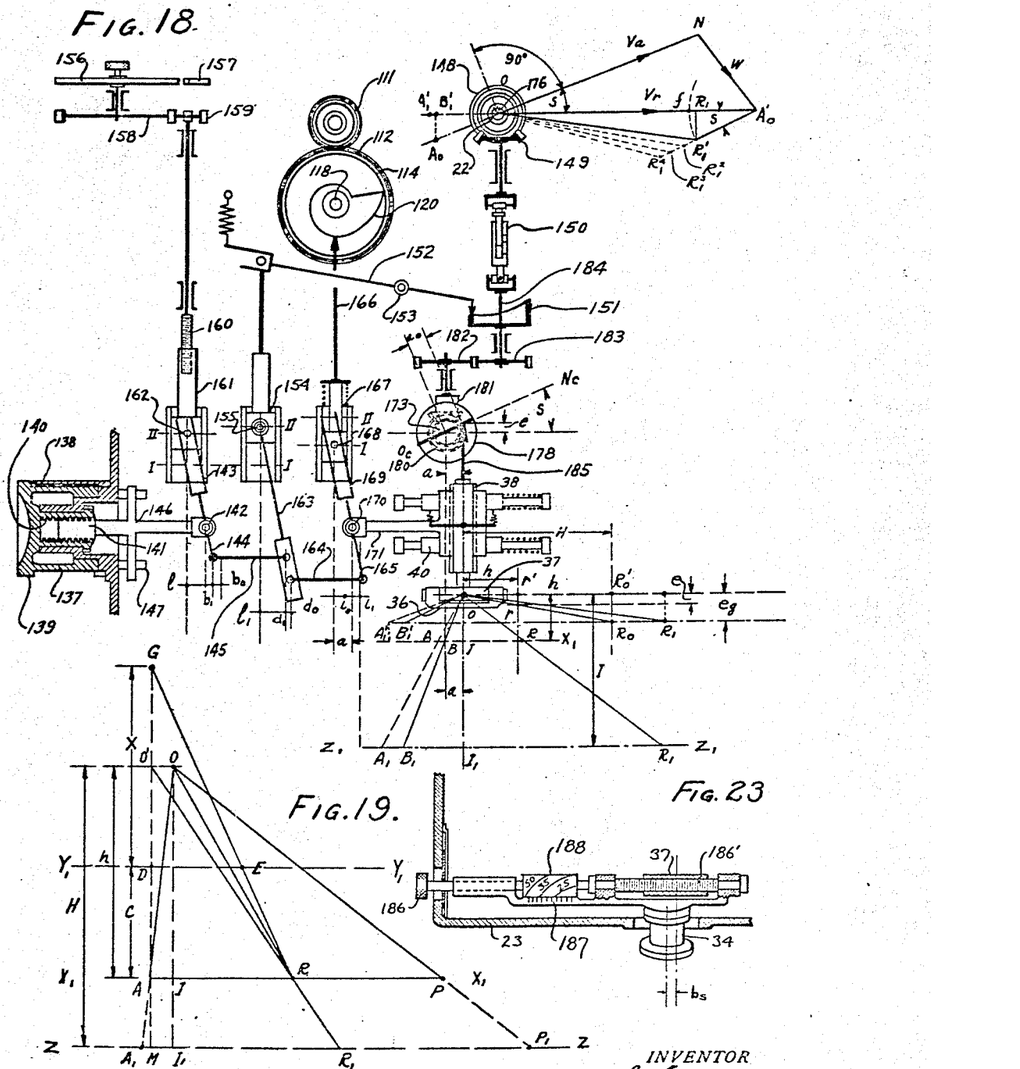
Fig. 18 is a diagrammatic representation of the correcting device relative to type of bomb, air speed, wind speed, drift angle, altitude and air density.
Fig. 19 is a diagrammatic representation of the space factors and angles of the sighting device.
Fig. 23 is a detail showing the correcting device for dropping the bomb "short" of the objective.

Reference to Figs. 18 and 19 of the drawings, which show diagrams of an apparatus constructed in accordance with the present invention, indicates that the bomb may be released at the proper instant so that it will hit the objective. In this diagram trail corrections and wind deflections are considered.

Figure 21:
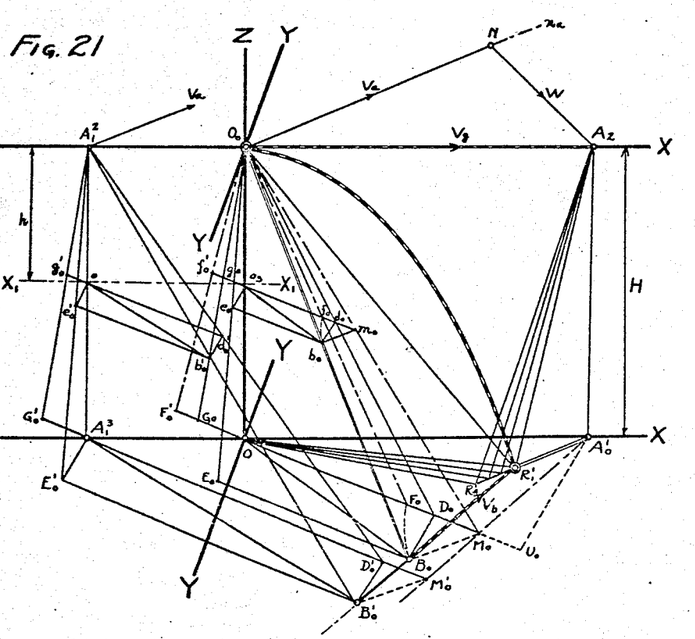
Fig. 21 is a diagrammatic representation of the space factors and angles in a three coordinate system, for a moving objective.
Figure 22:
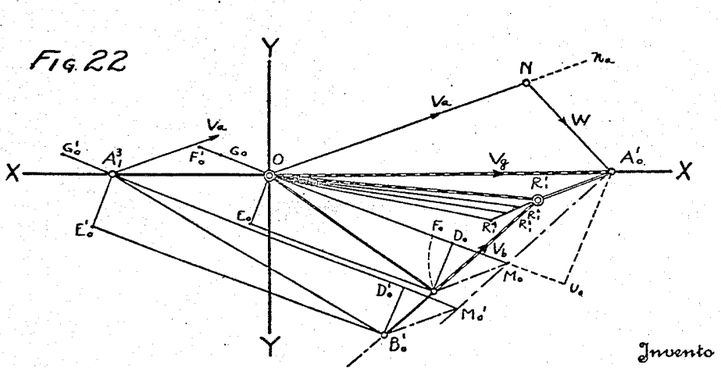
Fig. 22 is a diagrammatic plan view corresponding to Fig. 21.

XX, YY, ZZ are the axes of a three-coordinate system. (See Fig. 21)
$X_1 X_1$ is the axis of the micrometric screw 32
$Y_1 Y_1$ is the axis of the guide 59
$Z_1 Z_1$ is the ground
P is the pin 30 of nut 31
R is the position of pin 96 of adjustable slide 97 at moment of bomb release
O is the pivoting pin 55 of the sighting link 25 (trail considered)
O' is the pivoting pin of the sighting link 25 (trail not considered)
OP is the sighting line at the beginning of the synchronizing operation
OR is the sighting line at moment of bomb release
$I_1 R_1$ is the range, see Fig. 23
$V_a$ is the air speed
W is the wind speed
$V_g$ is the ground speed
$V_r$ is the relative speed
$V_b$ is the speed of a moving objective
$O R_1'$ is the range for a fixed or moving objective, indicated in Fig. 22
$O B_0$ relative range for movable objective
$R_1' A_0' = A_1 I$ corrected trail
$R_1^t R_1^t$ = temperature correction of trail
$R_1^e R_1^e$ = trail correction according to elevation of objective
$R_1^a R_1^a$ = trail correction according to actual altitude of bombing
$R_1 A_0' = B_1 I_1 = A_0' R_1' \cos N O A_0'$ = ground component of corrected trail for fixed objective
$M_0' D_0' = M_0 D_0 = O G_0 = A_0' R_1' \cos N O U_0$ = relative component of corrected trail for moving objective
$R_1 R_1' = A_0' R_1' \sin N O A_0'$ = deflection component for fixed objective
$B_0' D_0' = B_0 D_0 = O E_0 = A_0' R_1' \sin N O U_0$ = deflection component for moving objective
$O R_1 R_1' = 90°$
$M O N = 90°$
$G M P_1 = 90°$
$M_0 D_0 B_0 = M_0' D_0' B_0' = F_0' O E_0 = 90°$
Angle $N O A_0'$ = angle $R_1 A_0' R_1'$ is the drift angle
Angle $A_0' O U_0$ = angle of approach for moving objective
Angle IOP is the pick-up angle
Angle IOR is the range angle
Angle AOI is the trail angle (no drift considered)
Angle $O O_0 B_0$ is the relative range angle for moving objective
Angle BOI is the ground component of the corrected trail angle (drift considered)
Angle $O O_0 G_0$ is the relative component of the corrected trail angle for moving objective
Angle $R_0 O R_0'$ is the deflection angle
Angle $O O_0 E_0$ is the relative deflection angle for moving objective
$A_1^0$ position of airplane when synchronizing operation is started
$O_0$ point of bomb release
$B_0$ position of moving objective at instant of bomb release
$B_0 R_1'$ is the path of moving objective during falling time of bomb
h is the basic height of the instrument H is the vertical elevation or height of bombing
C is a constant of the apparatus
X is a variable which is a function of T which in turn is a function of H and of type of bomb
T is the actual falling time of the bomb
t is the falling time in vacuum
$\Delta t$ is the time lag depending upon heights and type of bomb
$t_p$ is the personal lag
K is a coefficient of speed
R is the radius of the variable speed disc
k is a coefficient depending upon air density in relation with height of plateau to be bombed
$k = 1.0$ at sea level
$k_t$ is a correcting coefficient depending upon atmospheric temperature affecting terminal velocity of bomb
$k_h$ is a correcting coefficient for trail angle according to actual altitude of bombing It can be proved that if we make $$K = \frac{R}{V_g} \text{ or } \frac{R}{V_r}$$

and $DE = KV_g$ or $KV_r$ and if the airplane is flying adrift, the tangent of the range angle is equal to—

$$= \frac{1.0}{H} \left\{ \left[ \frac{\frac{c}{x}+1.0}{K} - R_1^t A_0'.k.k_t.k_h. \cos A_0' ON \right]^2 + \{R_1^t A_0'.k.k_t.k_h \sin A_0' ON\}^2 \right\}^{\frac{1}{2}}$$

and the tangent of the relative range angle when bombing a moving objective is equal to—

$$= \frac{1.0}{H} \left\{ \left[ \frac{\frac{c}{x}+1.0}{K} - R_1^t A_0'.k.k_t.k_h \cos N O V_0 \right]^2 + \{R_1^t A_0'.k_t.k.k_h \sin N O V_0\}^2 \right\}^{\frac{1}{2}}$$

in which $$K = \frac{R}{V_r}$$

and where $$V_r = \Big\{ \{V_a^2 W^2 - 2 V_a W \cos(180 - A_2 N_{na})\} \cos^2 A_0' O U_0 \Big\}^{\frac{1}{2}} \pm \Big\{ V_b^2 - \{V_a^2 W^2 - 2 V_a W (\cos 180 - A_2 N_{na})\} \sin^2 A_0' O U_0 \Big\}^{\frac{1}{2}}$$

which are the formulae upon which the instrument operates.

The function $$\frac{\frac{c}{x}+1}{K}$$

is determined by setting exactly the altitude scale 114 and by synchronizing line OP with the target. (See Fig. 19.) This function is then computed automatically by means of the mechanism heretofore described.

The value $R_1^t A_0'$ which is the trail for the particular type of bomb and air speed, average altitude, a definite atmospheric temperature, and with objective at sea level as shown in the upper diagrammatic illustration of Fig. 18, is determined by setting the terminal velocity scale 137 and air speed index 138 fixed to the housing 23.

This value $R_1^4 A_0'$, however, is not correct but is corrected so as to bring the point $R_1^4$ back to $R_1^3$ and simultaneously from $R_1^3$ to $R_1^2$ in order to correct for the atmospheric temperature and for the height of the objective above sea level, this being done by setting the air density dial 156 on the temperature index 157; and then the point $R_1^2$ is moved back to $R_1'$ to correct for the actual altitude of the airplane and the particular type of the bomb, this correction being made by cam 120 controlled by altitude scale 114 operated by handwheel 117.

The terminal velocity is set on a drum 139 (Fig. 18) having a threaded part 140 for operating with a screw 141, which extends into the housing and carries a pivot 142 about which the link 143 is rotatable. The link 143 has rigid with it an arm 144 on which is provided a stud or arm 145. Screw 141 is prevented from turning about its axis by an arm 146 which bears against two guide bars 147. The stud 162 of slide 161 is shown in position II in Fig. 18. The correction obtained at sea level by means of arm 144 and part 141 is $b_0$ multiplied by various leverages on the sight, or $R_1^4 A_0'$ on the ground and gives the tangent of the trail angle for average altitude for the particular type of bomb and for the particular air speed.

The correction $R_1^4 R_1^3$ is obtained by setting the air density dial 156 on temperature index 157 in accordance with the actual atmospheric temperature, $$A_0^1 R_1^1 = K_t.(R_1^1 A_0^1)$$

The correction $R_1^3 R_1^2$ is obtained by setting the air density dial 156 on temperature index 157 in accordance with the height of the objective, the dial 156 cooperating with index 157 fixed on housing 23 and moving the link 143 through the gears 158, 159, screw 160 and sliding member 161 carrying stud 162 about which the link 143 rotates. At sea level and for particular temperatures stud 145 carried by the arm 144 is at position $b_0$. In turning the dial 156 up to a determined temperature index value at 157, the stud 162 will be set at position II and since stud 142 is fixed, lever 143 will rotate about the stud 142, carrying the right-hand end of stud 145 to position $b_1$ for objective above sea level and for actual temperature, $$A_0^1 R_1^1 = K.(R_1^1 A_0^1)$$

The correction thus obtained is $b_0 b_1$ multiplied by various leverages on the bomb sight corresponding to $R_1^4 R_1^2$ on the ground. The stud 155 of drift correcting device is at position I corresponding to drift angle equal zero, and lever 163 pivoting about 155 transmits the movement of 145 to 164 which pushes lever 165 and slide 40 respectively, since link 169 rigid with 165 pivots about 168. The slide 40 is displaced longitudinally a distance equal to $$R_1^1 A_0' \frac{h}{H}$$

As previously mentioned the point $R_1^2$ is then brought to point $R_1'$ in accordance with the actual altitude of the airplane. The terminal velocity and air speed movements caused by part 141 correct only the tangents of the trail angle for an average altitude, making necessary an auxiliary correction for the actual trail correction in accordance with any particular altitude of bombing. This is obtained by means of the altitude cam 120, fixed on the shaft 118, which carries altitude scale 114. The cam 120 cooperates with the stud 166 which is attached to the sliding member 167 carrying a stud 168 pivotally interconnecting the link 169 to the slide. The arm 165 is rigid with link 169, which pivots about axis 170 carried by the arm 171 which is fixed to the longitudinal slide 40. At average altitude, the stud 168 is at position I, and at position II for some particular higher altitude. The displacement of stud 168 from I to II causes the correction $$R_1^2 R_1^1 \text{ or } (R_1^1 A_0^1) = K_\lambda (R_1^2 A_0^1)$$

and the total corrected trail will be $R_1' A_0'$ on the ground;

$$R_1' A_0' \frac{h}{H} = BI = a$$

(see Fig. 18).

When bombing an objective situated at sea level, from average altitude and at a fixed temperature the trail correction is $R_1^4 A_0'$. When bombing an objective situated at sea level from some average altitude and under some actual temperature the trail correction is $R_1^3 A_0'$.

When bombing an objective situated above sea level from an average altitude and at some actual temperature the trail correction is $R_1^2 A_0'$. When bombing from some lower altitude with the objective above sea level and under some actual temperature the trail correction will be $R_1' A_0'$.

The total corrected trail made by the slides 167 and 161, and by the rod 141 is, therefore, $R_1' A_0'$. This corrected trail line, however, is not on the ground course line, and to correct the trail for the ground course component or relative component if flying along an angle of approach with respect to the path of a moving objective, slide means are provided to accomplish this automatically in accordance with the angular movements of the sighting device, or in other words in accordance with the drift angle, or drift angle plus angle of approach if bombing a moving objective.

Figure 5:
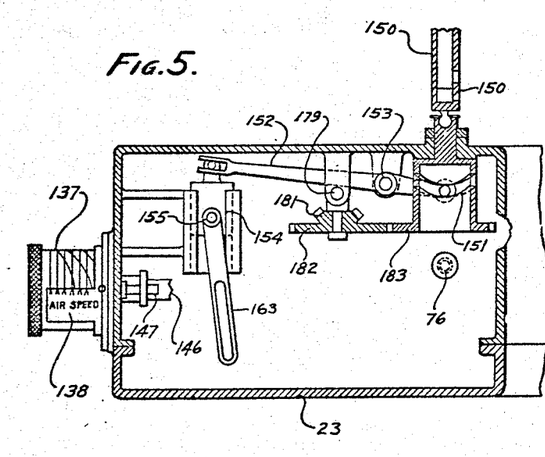
Fig. 5 is a horizontal section on the line 5—5 of Fig. 4, also showing part of the pilot directing device.
Figure 9:
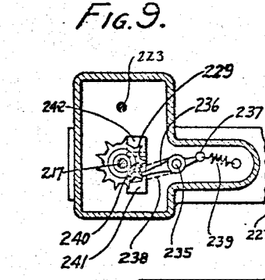
Fig. 9 is a transverse vertical section on line 9—9 of Fig. 6, showing part of the pilot director mechanism.

The entire standard 21 may be swung about axis of the post 22 by means of a suitable handle 175 so that the sighting line of the telescope may point directly at the objective, in case there is a cross wind prevailing or cross wind combined with angle of approach $A_0' O U_0$. This swinging of the standard 21, and consequently of the supporting housing 23, operates the "pilot director" shown in Figs. 5 and 9, and also causes the rotation of the bevel gear 149 (Fig. 18); the bevel gear 148 being fixed on stud 174 which has a key 176 setting in slot 177 of post 22 which is fixed to the fuselage of the airplane, thus preventing gear 148 from turning about its axis when the standard 21 is swung. Therefore, the swinging of the standard 21 causes the rotation of bevel gear 149, the sliding gimbal joint 150 and the cam 151 cooperating with lever 152, see Figs. 18 and 6, which pivots about axis 153 fixed to the housing 23. The fork of lever 152 cooperates with a sliding member 154 on which is fixed a stud 155, about which pivots lever 163. The rotation of cam 151 causes the displacement of stud 155 from position I corresponding to drift angle=zero to position II corresponding to a certain drift angle, or a certain drift angle combined with a certain angle of approach $A_0' O U_0$, indicated in Figs. 21 and 22, thus making the ground or relative component of the trail which are: $R_1'A_0' \cos A_0'ON$ and the relative component $R_1'A_0' \cos NOU_0$ when flying adrift and flying along an angle of approach $A_0'OU_0$ in respect to a moving objective.

The correction $R_1^4A_0'\sin A_0'ON.k.k_t.k_h$ or $R_1^4A_0^1 \sin NOU_0.k.k_t.k_h$ is obtained by the rotation of the cam 178, which pivots about axis 179 fixed to the housing 23. The cam 178 is driven by bevel gear 180, 181 gears 182 and 183; gear 183 being fixed on the shaft 184 which carries cam 151, so that when swinging the standard 21 about its vertical post 22, cam 178, rotates through an angle S equal to the drift angle $NOA_0'$, or through an angle S' equal to the drift angle plus angle of approach, so as to keep the geometric plane $O_cN_c$ of the cam 178 always parallel to the axis ON of the fuselage of the aircraft whatever the drift angle or angle of approach may be.

The cam 178 cooperates with a stud 185 fixed to the transverse slide 38 carrying the pivot 37 and pin 35 of the sighting member 25.

Since $BI=a$ is the ground component of the trail reduced to the height $h$ of the instrument, or $G_0O_3$ the relative component of the trail reduced to the height $h$ of the instrument, and since BI is making an angle S with respect to the fuselage or $G_0O_3$ making an angle S' with respect to the fuselage, and since the working surface $O_cN_c$ of the cam 178 is always maintained parallel to the fuselage of the aircraft making an angle S or S' with the longitudinal axis of the sight, the slide 38 will move laterally a distance corresponding to $$e = rr' = R_1^4A_0' \sin A_0'ON.k.k_t.k_h \cdot \frac{h}{H}$$

or $$e_0O_3 = R_1^4A_0' \sin NOU_0.k.k_t.k_h \cdot \frac{1}{H}$$

for the relative deflection.

Since the bearings 42 and 43 of the frame 36 provide for rotational movements about axis 32, the lateral displacement $rr'$ or $e_0O_3$ of the hinge 37 carrying the upper part of the frame 36 will cause the lateral inclination of the optical sighting line along a plane $A_1'OR_1$ making a deflecting angle $R_0OR_0'$ with the vertical $R_0'O_1$ or will cause the relative lateral inclination of the optical sighting line along a plane $E_0O_cB_0$ making a relative deflecting angle $E_cO_cO$ with the vertical $O_0O$ thus making automatically the deflection correction according to any particular type of bomb, any particular height, time lag, drift angle, angle of approach, speed and direction of moving objective, air speed, ground speed, elevation of the objective above sea level, and atmospheric temperature affecting terminal velocity.

It will thus be understood that by means of the cam 178, a certain lateral movement of the upper end of the sighting member is obtained, and by means of the cam 151 and its slide 154, a certain longitudinal movement of the upper end of the sighting member is obtained, and together make correction $R_1'A_0' \sin NOA_0'$ or $R_1'A_0' \sin NOU_0$ and $R_1'A_0' \cos NOA_0'$ or $R_1'A_0' \cos NOU_0$ when the bomb is released, therefore, it will strike the objective $R_1'$ instead of the theoretical objective position $A_0'$. The axis 37 carrying the hinge of the frame 36 is movable longitudinally for slight longitudinal displacement $b_s$ of the telescope in order to compensate for slight increment of range. This operation, called dropping bomb "short", is obtained by a special scale graduated in feet set on a drum 188 (Fig. 23) fixed to the screw 186' which cooperates with the nut fixed to 37.

The setting of the drum 188 (see Fig. 23) with respect to scale 187 which is fixed to the optical device 26 is made by turning knob 186. The rotational adjustment of the drum and screw 186' moves the optical device a distance $b_s$ and increasing the range by a corresponding amount, since this rotation of the screw moves the optical device bodily with respect to the frame 36.

Another method of dropping bomb "short" when automatic release is used, can be obtained by estimating a short distance on the ground when sighting through the telescope and then when said short distance is properly estimated, pull swiftly the main control 81 which through the train of gears 85, 86, 87, 88, 78, 77, 75, 74, 72, 71, the differential 92 and gears 133, 134 and 135, will create an extra rotation of screw 32 and rapidly bring contacts 99 and 98 together which energizes magnet 209 and releases the bomb.

During that short instant in dropping "short" the rapid pulling of control 81 also increases the speed of the nut 31 and simultaneously pushes the timing lever 129 forward, and the contact 98 respectively thus dropping bomb "short" without delay and at the will of the bomber. The stud 189 fixed on drum 187 and stop 190 fixed on the housing 23 prevents the drum from being turned more than 360°.

To compensate for shifting of weight while the position of the nut 31 and of the sighting member 25 is being changed, and to maintain the center of gravity of the suspended housing 23 constant, a compensating weight 191 (Fig. 4) is provided, this compensating weight being mounted on a screw 192 and connected by a suitable means to the nut 31 so that as the nut moves toward the center of the housing 23 the weight 191 will also move the proper distance to compensate for shifting of the effective weights of these various parts, and maintain the center of gravity of the apparatus constant. As shown gear 135 fixed on the micrometric screw 32 rotates screw 192 through gear 193. At the base of the housing 23 is a slot 194 in which slides stud 195 which is fixed to the nut carrying weight 191, thus preventing the weight from turning about its axis.

Movement of the timing member 95, guide bracket 56, and slide 97 is also compensated for by means of a weight 196 which is in threaded engagement with the screw 73 so that as the timing member 95 and its associated parts move toward the left in Fig. 4, the weight 196 will be moved toward the right a proportionate amount to prevent the unbalancing of the suspended housing 23. To prevent the weight 196 from turning with the screw 73 the former is guided by a stud 197 which moves freely along guide 198 and which prevents rotational movements about the axis of the screw 73.

The supporting housing 23, although mounted for free swinging movements both laterally and longitudinally of the aircraft, is stabilized so that rapid or sudden changes in position of the aircraft may be substantially ineffective on the housing 23. The upper part of the housing 23 projects upwardly at 199 and carries a post 200 which is universally connected at 201 to the piston rod 203 of a piston operating in a cylinder 205 to provide a dash pot damping means for damping the movement of the supporting housing 23. A similar dash pot 206 is provided on the top of the standard 21 above the supporting housing and effective at 90° from the dash pot first mentioned. The dash pot construction is all carried by the standard 21, the parts carried by the movable housing 23 being of comparatively simple and light construction so that the suspended part of the bomb sight will not be materially heavier by reason of the damping device.

The bomb 207 (Fig. 4) is mounted on a suitable rack 208 and is releasable from this rack when a solenoid or electromagnet 209 is energized. One side of this electromagnet 209 is connected to one side of the battery 49 the other side of the solenoid being connected to the contact 99 on the movable nut 31. The other side of the battery is connected to a disconnecting switch 210 which however is closed when the apparatus is to be used. The switch 210 is in turn connected to the motor 45 through the regulating contacts 48, and also connected to electromagnets 211 and 218 and releasing signal light 102, as shown. The electromagnet 211 is connected to the stop contact 98.

When the electromagnet 211 is energized the armature of a starting lever 212 is attracted. The lever 212 is provided with a hook 213 and cooperates with a stop 214 slidably mounted on the shaft 79. Sliding movements are imparted to this stop 214 toward the left by endwise movements of a spindle 215 which is provided with a knob 216 at its outer end, in a position to be readily pressed inwardly by the hand of the operator when he grasps hold of the lever 81. A spring 217 normally presses the knob 216 and the spindle 215 toward the right, tending to hold the stop 214 toward the right in Fig. 4, in which position the contact 250 will be open-circuited in inoperative position. However, when the knob 216 is pressed inwardly to the position shown in Fig. 4 the stop 214 will ride over the inclined cam surface of the lever 213 and close the contact 250, the stop 214 being held in its effective position against the action of the spring 217, by means of the hook on the lever 213.

The mechanism of the pilot directing device is enclosed in a housing 218 fixed to the standard 21 which is rotatably mounted on the post 22. This mechanism comprises a worm gear 219 fixed to a sleeve 220 rotatably mounted on the post 22. A friction spring 221 fixed at one end to the post 22 prevents the standard 21 from turning freely on the supporting post 22, see Fig. 11. On the shaft 223 guiding the worm 222 is fixed a pinion 224 meshing with gear 225 and turning in bearings 226. The shaft 227 is fixed to the gear 225 and the clutch part 228. A toothed wheel 229 together with clutch part 230 turns freely about the shaft 227. Clutch parts 231 and 232 are fixed to the control 175 which is rotatably and longitudinally slidable in the bearing 233 provided in the housing 218. A spring 234 is provided to normally engage the clutches 228 and 231 in a constant manner so that the control 175 is in constant engagement with the gear 225 and the worm gear 219.

Figure 10:
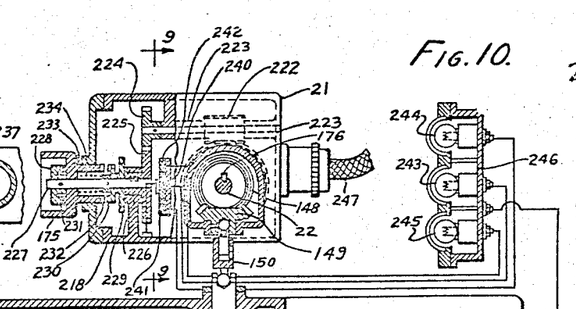
Fig. 10 is a sectional view of the pilot director indicator.

On shaft 235 which turns in the bearings in the housing 218 are fixed levers 236 and 237 and an electric contact lever 238. The lever 236 is in engagement with the teeth of toothed wheel 229. One end of the spring 239 is fixed to the housing 218 while its other end is attached to the lever 237, thus normally urging the contact lever 238 to a central position, in a yielding manner, each time the lever 236 passes over a tooth of the wheel 229. The contact lever 236 thus passes alternately from a central contact 240 to a right-hand contact 241 if the control 175 is turned to the right, and from the central contact 240 to the left contact 242 if the control 175 turns in the other direction. The central contact 240 is electrically connected to a central lamp 243, see Fig. 10, preferably colored white, and meaning "fly straight course", when this lamp 243 is illuminated. The left contact 242 is connected to the left-hand lamp 244, having a suitable color and indicating to the pilot that he should turn the aircraft toward the left side, when this lamp is illuminated. The contact 241 is connected to the right-hand lamp 245 indicating to the pilot that he should turn toward the right when this lamp is illuminated. These three lamps, all three different colors, are enclosed in a housing 246 which is located on the pilot's instrument board.

An electric cable 247 connects the bomb sight electrically to the battery, the bomb releasing device and the pilot director indicator.

In operation, the pilot director automatically tells the pilot in which direction he should turn or whether he should fly straight ahead, these indications being given to him automatically as the bomber follows the objective and turns the bomb sight about its vertical axis, or keeps it stationary with respect to turning movements. Assume the aircraft is flying off its course, for example toward the left. The central contact lever 238 has been at its neutral position and the lamp 243 has been lit, the pilot having flown a straight course. The bomber now, as the aircraft is flying off course, toward the left, places the sighting line on the target by swinging the standard 21 about the post 22 by pushing control knob 175 toward the target (right-hand side) without turning 175 about its axis. The lamp 243 is still lit and the aircraft is still flying in a straight line off course as just stated. The bomber then follows the apparent and drifting motion of the target by pushing and turning the control 175 about its axis; in doing which the clutch parts 230—232 are engaged (clutch parts 231—228 remaining engaged) so that the toothed wheel 229 is rotated, the teeth of this wheel displacing the lever 236 toward the right-hand side, thus moving the contact lever 238 over to contact 241 and lighting and causing the energization of the lamp 245, the lamp 243 being deenergized. This indicates to the pilot that he should turn toward the right, the indication being automatic. The bomber then releases the control 175 which disengages the clutch 232—230 and the central lamp 243 is again illuminated and lamp 245 deenergized.

The course of the aircraft is thus partially corrected, the bomber again adjusting the sighting line on the target by turning the control about its axis, without giving any signal of turning. Then when the target appears to be drifting, the bomber pushes and turns the control 175 to give the necessary signal that the aircraft should be turned. The faster the target drifts from the sighting line of the telescope, the more rapidly the alternate energization of the lamps 243 and 245 or 243 and 244 will take place. The speed at which the alternations of the right-hand lamp or the left-hand lamp with the central lamp takes place indicates the amount of turn required. A very rapid correction of the aircraft with respect to the target can thus be obtained.

The operation of the device is as follows:

The switch 210 being closed, the trail correction and other corrections are made by suitably setting drum 137, scale 157 and scale 188 if it is desired to drop bomb ahead. Then the pick-up angle is set by means of the scale 62 and index 66 by turning control 67 which through friction clutch 69, gears 68, 70 and differential 61 displaces the nut 31 forward or backward. The nut 31 is carrying the telescope 26. The standard 21 is then swung about the axis of the post 22 to make course correction as above described until the objective moves directly towards the observer when sighting along the telescope or the sighting member 26. The bomber then synchronizes the movement of the sight with the objective. He first grasps the handle 81 with his hand and in doing so he naturally presses inwardly on the knob 216 to cause the spindle 215 to move inwardly and move the sliding stop 214 so that the spring 248 may push the hooked lever 214 upward to maintain stop 214 in hooked or effective position.

When being engaged by hook 213, the conical part of the sliding stop 214 pushes up the spring contact 249 making contact with an insulated contact 250 connected to solenoids 211 and 218 which are in parallel, and simultaneously energizes the motor 46 through regulator 47. The bomber then sights in the telescope 26 to see whether or not the optical line is moving in synchronism with the objective. If not, the bomber pulls or pushes handle 81 which, through the gears 85, 86, 87, 88, 78, 77, 75, 74, 72, and 71, varies rapidly the speed of rotation of the micrometric screw 32, by varying the variable speed connection between the motor and the screw 32.

Simultaneously, in varying the speed of screw 32 by operation of handle 81, through differential 92 and gears 133, 134, and 135, the nut 31 carried by screw 32 will be stepped forward or backward, thus catching the target rapidly and automatically with respect to the recticle of telescope 26.

For fine synchronizing regulation, the bomber turns knob 82 which, through differential 89, gears 90, 91, 78, 77, 75, 74, 72, and 71, varies slowly the speed of rotation of the micrometric screw 32 and as stated before, the nut moves forward or backward, thus catching automatically the target in respect to the recticle of the telescope.

This regulation of knob 82 is continued until the optical line of the telescope 26 remains synchronized with the objective, and in synchronizing the sights with the objective it will be understood that the bomber has accomplished automatically the adjustment of the timing member so that the latter is properly set for the release of the bomb at the proper instant. The bomber merely keeps regulating the knob 82 to maintain synchronization of the sights and the objective until the contacts 98 and 99 engage.

An instant before contacts 98 and 99 engage, contact 98 engages with warning contact 100 which lights the warning lamp 101 in the telescope 26.

When contacts 98 and 99 engage, it is the bomb releasing time, and releasing signal lamp 102 indicates to the pilot that the bomb should be released if releasing is to be made by hand, or indicates to the bomber that the bomb has been released if said operation is made automatically.

When this occurs a circuit is completed through the battery 49, the solenoid or electromagnet 209, and through the electromagnet 211, the result being the instantaneous dropping of the bomb.

Another result is the attraction and lowering of the hook 213, due to energization of the electromagnet 211 which thus releases sliding hook stop 214 which cuts the circuit between contacts 249 and 250, thus interrupting the circuit through signal lamps 101 and 102 and through motor 46 which stops.

Another result of the engagement of contacts 98 and 99 is the energization of the solenoid 218 which automatically places the handle 81 at its original position, and simultaneously places the timing lever 95 in a normal vertical position, thus separating contacts 98 from 99, preventing the accidental release of another bomb if the bomber accidentally pushes knob 216, and preventing jamming of the apparatus by accidental subsequent operation of control 81. The plunger of solenoid 218 is connected to the handle 81 by means of a steel ribbon 252, one end of which is fixed to the plunger, the other end to a stud 253 fixed to the segment gear 85 so that the return of the handle 81 to its normal position may be accomplished.

To reset the synchronizing nut 31 so that it is in position for a second bombing operation, the screw 32 is rotated manually by handwheel 67 to place the optical line of the telescope at the proper pick-up angle. Then, the general operations of the sights are started again as just described.

The operation of the device is quite simple, considering the extremely accurate results that may be obtained and the number of correction factors that are taken into consideration. The probability of human errors are to a large part obviated, and the apparatus may be operated very quickly and yet with extreme accuracy. While the device is provided with adjustments for the correction of many factors, it will be apparent that all of these correction adjustments need not be employed if it is desired to neglect the errors arising.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a sighting device of the class described, a movable sighting member adapted to be trained on an objective to follow the relative movement between an objective and the sighting device, means for laterally angularly adjusting said member to compensate for wind deflection and trail correction, an adjustable timing lever, means for adjusting a portion of said timing lever in accordance with vertical elevation, means for adjusting another portion of said timing lever in accordance with the speed of movement of said sighting member, means for controlling the speed of movement of said sighting member, and means controlled by said sighting member and said timing lever to determine the moment of bomb release.

2. In a sighting device of the class described, a movable sighting member adapted to follow the relative movement between an objective and the sighting device, an adjustable timing member, means for adjusting said timing member so that it is set in accordance with the proper time of bomb release, supporting means for said members, said timing member being movable in said supporting means to unbalance the supporting means, a standard, a universal connection between said standard and said supporting means, damping means for damping the movements of said supporting means, and weight means carried by said supporting means and operably connected to one of said members for automatically compensating weight unbalance due to movements of said member.

3. In a sighting device of the class described, a movable sighting member adapted to follow the relative movement between an objective and the sighting device, an adjustable timing member, means for adjusting said timing member so that the proper moment of bomb release is determined, power means for moving said sighting member, speed changing mechanism between said power means and said sighting member, manually controlled means for adjusting said speed changing mechanism to cause the sighting member to follow the relative movement between an objective and the sighting device, means for energizing said power means automatically upon starting operation of said manually controlled means, and means for automatically deenergizing said power means after a synchronizing operation has been completed.

4. In a sighting device of the class described, a movable sighting member, an adjustable timing member, motor means for moving said sighting member, and a control device for controlling the speed of said sighting member having provision operable as a lever for rapidly changing the speed and additional means provided as a part of said lever for slowly changing the speed.

5. In a bomb sighting device of the class described, a movable sighting member, means for causing said sighting member to follow the relative movement between an objective and the sighting device, an adjustable timing member determining the moment of bomb release, a stationary sign in the sighting field of vision, and means for illuminating said sign substantially at the time of bomb release.

6. In a sighting device of the class described, a sighting member movable in accordance with the relative movement between an objective and the sighting device, an adjustable timing member, an element operated by said timing member and cooperating with said sighting member to determine the time for projectile release, and means for adjusting one of said members manually comprising a series of separate scales, and an adjustable index member cooperating therewith and having a series of openings that may be brought into view selectively, each scale cooperating with one of said openings and visible therethrough.

7. In a sighting device of the class described, a movable sighting member adapted to follow the relative movement between an objective and the sighting device, means adjustably supporting one end of said sighting member for horizontal movement, an inclined timing bar fulcrumed at its upper end, a horizontally moving timing element positioned by angular movement of said timing bar and cooperating with said sighting member to determine the proper time of bomb release, and means adjustably supporting the fulcrum of said timing bar for adjustment vertically.

8. In a sighting device of the class described, a movable sighting member adapted to follow the relative movement between an objective and the sighting device, means adjustably supporting one end of said sighting member for horizontal movement, an inclined timing bar fulcrumed at its upper end, a horizontally moving timing element positioned by angular movement of said timing bar and cooperating with said sighting member to determine the proper time of bomb release, means adjustably supporting the fulcrum of said timing bar for adjustment vertically, means for controlling the speed of said sighting member including a manually positionable means and a variable speed drive positioned therefrom, and a compensating mechanism interconnecting said manually positionable means and said sighting member for automatically stepping the sighting member forward or backward as the speed is changed to quickly move the sighting member toward the line of the target.

9. In a sighting device of the class described, a movable sighting member including an optical part adapted to be trained on and follow the movements of an objective, an adjustable timing member, means for positioning said timing member in accordance with the angular speed of said sighting member in following a target, an element operated by said timing member and engaging with said sighting member at the time for projectile release, a support for said members, a pivotally mounted frame carrying said sighting member, and means for tilting said frame about a fore and aft axis to automatically tilt said optical part in accordance with wind deflection due to the drift angle and angle of approach of the sighting device with respect to the objective.

10. A bomb sighting device for aircraft comprising an angularly movable sighting member adapted to follow the relative movements between an objective and the sighting device, an adjustable timing member, means for positioning said timing member in accordance with the angular speed of said sighting member in following a target, an element operated by said timing member and engaging with said sighting member at the time for projectile release, a fixed support, a housing adjustable on said support and carrying said members, a longitudinally adjustable carrying member to which one portion of said sighting member is pivoted, means pivotally supporting another portion of said sighting member on said housing for movement about a fore and aft axis, means for moving said carrying member laterally as said housing is rotated on said support to tilt said sighting member about said axis, and means for longitudinally adjusting said carrying member to longitudinally adjust the sighting member without alteration to its angle of tilt.

11. A bomb sighting device for aircraft comprising an angularly movable sighting member adapted to follow the relative movements between an objective and the sighting device, an adjustable timing member, means for positioning said timing member in accordance with the angular speed of said sighting member in following a target, an element operated by said timing member and engaging with said sighting member at the time for projectile release, a stabilized support for said members, means rotatably mounting said support on a fixed vertical axis, slide means operable in accordance with rotational movement of said support on said fixed vertical axis for adjustably tilting said sighting member laterally with respect to the direction of travel, and means connected to said slide means for correcting the trail deflection in accordance with the sines of the drift angle and the angle of approach as the support is rotated on its vertical axis.

12. In a sighting device of the class described, a movable sighting member adapted to follow the relative movement between an objective and the sighting device, an adjustable timing bar, means for manually adjusting the upper end of said timing bar in accordance with vertical elevation, means for adjustably setting an intermediate portion of said timing bar in accordance with the speed of the movable sighting member, a timing element cooperating with the sighting member and positioned by the lower end of said timing bar, and compensating means for said members for compensating for wind deflection and trail correction.

13. In a sighting device of the class described, a movable sighting member having a sight adapted to be trained on the objective to follow the movement between an objective and the sighting device, manually controlled power means for moving said sighting member so it follows the apparent movement of the objective, an adjustable timing member having a pivotal support, means for vertically adjusting said pivotal support to set said timing member in accordance with vertical elevation, means for moving a portion of said sighting member in the direction of the ground speed course to compensate the line of sight for trail correction, and means for adjustably setting said timing member in accordance with the speed of said movable sighting member.

14. In a sighting device of the class described, an elongated movable sighting member having a sight at its lower end, power means for longitudinally moving one end of said sighting member, manually controlled but normally stationary means for governing said power means so that said sighting member follows the relative movement between an objective and the sighting device, an adjustable timing member cooperating with said sighting member to determine the time of projectile release, a pivotal support for the upper end of said timing member, means for vertically adjusting said pivotal support to set said timing member in accordance with vertical elevation, a pivotal support for the other end of said sighting member, means for moving said last named support and sighting member in a direction parallel to the ground course to effect trail correction, means for moving said sighting member on its pivotal support transversely of the ground course to compensate for lateral wind, and mechanism interconnecting said timing member and said manually controlled means to constantly correct the adjustment of said timing member up to the time of projectile release in accordance with the speed of the movable sighting member.

15. In a sighting device of the class described, a movable sighting member having a sight at its lower end, power means for longitudinally moving one end of said sighting member, manually controlled but normally stationary means for governing said power means so that said sighting member follows the relative movement between an objective and the sighting device, an adjustable timing member cooperating with said sighting member to determine the time of projectile release, a pivoted support for the upper end of said timing member, means for adjustably setting said pivotal support in a vertical direction in accordance with vertical elevation, a pivotal support for the other end of said sighting member, means for pivotally moving said sighting member on its support to tilt said sighting member transversely of the ground course to compensate for lateral wind, means for moving said last named support and sighting member in a direction parallel to the ground course to effect trail correction, and mechanism interconnecting said timing member and said manually controlled means to constantly correct the adjustment of said timing member up to the time of projectile release in accordance with the speed of the movable sighting member.

16. In a sighting device of the class described, a movable sighting member adapted to be trained on an objective to follow the relative movement between an objective and the sighting device, a constant speed motor controlling the movements of said sighting member, a driving connection between said motor and said sighting member, said driving connection including a variable speed drive, a manually controlled member, and mechanical connection from said member to said variable speed drive to vary the speed of movement of said sighting member and cause it to follow the movement of the objective, an adjustable timing member, means connecting said member to said mechanical connection so that said timing member is automatically positioned in accordance with the speed of movement of said sighting member, means for adjusting one portion of said timing member vertically in accordance with vertical elevation, means for adjusting one portion of said sighting member longitudinally parallel to the ground course for trail correction in accordance with wind deflection, and additional means for adjusting said sighting member in a direction transversely of the ground course in accordance with the wind deflection.

17. In a sighting device of the class described, a movable sighting member, a constant speed motor for operating said sighting member, a manually controlled variable speed drive between said sighting member and said constant speed motor, an adjustable timing member, means for adjusting a part of said timing member vertically in accordance with altitude, means for adjusting a part of said timing member horizontally in accordance with the speed of the sighting member, means for adjusting one portion of said sighting member transversely of the ground course in accordance with wind deflection and additional means for adjusting said sighting member to change the line of sight in the vertical plane of the ground course in accordance with air resistance on the bomb.

18. In an aircraft, a bomb sighting device of the class described, comprising a movable sighting member, means for causing said sighting member to follow the relative movement between an objective and the sighting device, an adjustable timing member determining the moment of bomb release, a support for said members, turning means rotatable on the support for turning said support about a vertical axis, an automatic signal means provided adjacent the pilot's position for indicating to the pilot the desired direction of travel and rate of turn of the aircraft comprising a series of three lamps adjacent the pilot's position and means for automatically alternately controlling the energization of said lamps in accordance with the position of said support to indicate a desired turn in both direction and rate of turn to the right, to the left, or straight ahead, said last named means comprising an energizing contact for each lamp, a control finger selectively engageable with the energizing contacts, means normally maintaining said finger in engagement with the contact for one of said lamps, and means on said turning means for controlling the position of said control finger.

19. In a bomb sighting device of the class described, a movable sighting member adapted to follow the apparent movements of an objective, an adjustable timing member, a support for said sighting and timing members mounted for turning movement on a vertical axis, an element operated by said timing member and cooperating with said sighting member to determine the time for projectile release, means for adjusting said members in accordance with altitude and bomb time lag, means for adjusting said timing member in accordance with the speed of said sighting member, and mechanism for adjusting said sighting member, said mechanism comprising means for tilting said sighting member laterally of the ground course direction for correcting the sighting member in accordance with the sines of the drift angle and angle of approach, said mechanism also including individual longitudinal adjustment means for trail correction for air speed, type of bomb, altitude and atmospheric temperature.

20. In a bomb sighting device of the class described, a movable sighting member adapted to follow the relative movement between an objective and the sighting device, an adjustable timing member, an element operated by said timing member and cooperating with said sighting member to determine the time for projectile release, means for adjusting said sighting member in accordance with altitude and bomb time lag, means for adjusting said timing member in accordance with the speed of said sighting member, lateral adjustment means for tilting the sighting member laterally of the actual path of travel in accordance with the drift angle and angle of approach, and differential slide means for adjusting the sighting member in the direction of actual path of travel for correcting the trail in accordance with the altitude, temperature and drift angle.

21. In a bomb sighting device of the class described, a movable sighting member adapted to follow the relative movement between an objective and the sighting device, an adjustable timing member, an element operated by said timing member and cooperating with said sighting member to determine the time for projectile release, a support for said members, means for adjusting said sighting member in accordance with altitude and bomb time lag, means for adjusting said timing member in accordance with the angular speed of said sighting member, mechanism for angularly adjusting said sighting member in said support laterally of the ground course direction in accordance with the sine of the drift angle and angle of approach, and mechanism for adjusting said sighting member longitudinally in said support in accordance with drift angle, air speed, type of bomb and altitude of sighting device.

22. In a sighting device of the class described, a movable sighting member adapted to follow the relative movement between an objective and the sighting device, power means controlling said sighting member and including a speed changing device for controlling the speed of said sighting member, an adjustable timing member, an element operated by said timing member and cooperating with said sighting member to determine the time for projectile release, means for angularly adjusting said timing member from a normal vertical position in accordance with vertical elevation, means operable from a normal position for adjustably setting said timing member angularly in accordance with the speed of the movable sighting member, and means for automatically returning said speed changing device and said adjustable timing member to normal positions when said power means is deenergized.

23. In a sighting device of the class described, a movable sighting member adapted to follow the apparent movements of an objective, an adjustable timing member, means for controlling the speed of movement of said sighting member, means for adjusting said timing member in accordance with the speed of said movable sighting member, means for adjusting one of said members in accordance with vertical elevation, a housing enclosing said timing member, said movable sighting member including a sighting tube arranged externally of said housing and supported for pivotal movement relative to said housing about axes substantially parallel to and substantially transverse of the line of flight.

24. In a sighting device of the class described, a movable sighting member adapted to follow the apparent movements of an objective, an adjustable timing member, means for adjusting said timing member to determine the proper time for bomb release, a housing enclosing said timing member, said movable sighting member including an externally arranged sighting tube supported on said housing for movement about an axis transverse of the line of flight and for movement about a second axis substantially parallel to the line of flight.

GEORGES L. ESTOPPEY.